(12) United States Patent
Woodring

(10) Patent No.: US 9,025,738 B2
(45) Date of Patent: *May 5, 2015

(54) MESSAGING TRANSLATION SERVICES

(71) Applicant: AT&T Intellectual Property I, L.P., Atlanta, GA (US)

(72) Inventor: Larry Woodring, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,029

(22) Filed: Apr. 2, 2014

(65) Prior Publication Data

US 2014/0213224 A1 Jul. 31, 2014

Related U.S. Application Data

(63) Continuation of application No. 13/849,997, filed on Mar. 25, 2013, now Pat. No. 8,699,676, which is a continuation of application No. 12/637,378, filed on Dec. 14, 2009, now Pat. No. 8,406,385, which is a continuation of application No. 11/304,032, filed on Dec. 15, 2005, now Pat. No. 7,657,006.

(51) Int. Cl.
| | |
|---|---|
| *H04M 1/64* | (2006.01) |
| *H04M 3/42* | (2006.01) |
| *H04M 7/00* | (2006.01) |
| *H04M 3/533* | (2006.01) |
| *H04W 4/12* | (2009.01) |

(52) U.S. Cl.
CPC .......... *H04M 7/0054* (2013.01); *H04M 3/4211* (2013.01); *H04M 3/53366* (2013.01); *H04M 2203/2061* (2013.01); *H04M 3/533* (2013.01); *H04W 4/12* (2013.01)

(58) Field of Classification Search
CPC ......... G06Q 10/06; H04M 2203/2061; H04M 2242/12; H04M 3/4211; H04M 3/51; H04M 3/5166; H04M 3/523; H04M 3/5232; H04M 3/5233; H04M 3/5237; H04M 3/5238; H04M 5/533; H04M 5/53366; H04M 7/0054; H04W 4/12
USPC .................. 379/88.06–88.23, 114.01, 201.01, 379/207.02–207.15, 265.01–266.1; 704/2, 704/4, 9, 257, 270.1
See application file for complete search history.

(56) References Cited

U.S. PATENT DOCUMENTS

| | | |
|---|---|---|
| 6,219,638 B1 | 4/2001 | Padmanabhan et al. |
| 7,286,990 B1 | 10/2007 | Edmonds et al. |
| 7,418,390 B1 | 8/2008 | Jokipii |
| 7,657,006 B2 | 2/2010 | Woodring |
| 2002/0133342 A1 | 9/2002 | McKenna |
| 2003/0154080 A1 | 8/2003 | Godsey et al. |
| 2003/0163300 A1 | 8/2003 | Kasvand et al. |

(Continued)

FOREIGN PATENT DOCUMENTS

WO WO 2009029296 3/2009

*Primary Examiner* — Khai N Nguyen

(57) ABSTRACT

One embodiment of a method for translating a message can be broadly summarized by the following steps: generating an electronic message in an understood language of an originating party; receiving instructions to translate contents of the electronic message to another language; converting the electronic message to the another language in accordance with the instructions; and delivering the converted electronic message to the receiving party. Other methods and devices are also provided.

20 Claims, 5 Drawing Sheets

(56) References Cited

U.S. PATENT DOCUMENTS

| | | |
|---|---|---|
| 2003/0220784 A1 | 11/2003 | Fellenstein et al. |
| 2004/0067471 A1 | 4/2004 | Bennett |
| 2004/0102957 A1 | 5/2004 | Levin |
| 2005/0096909 A1 | 5/2005 | Bakis et al. |
| 2005/0267738 A1 | 12/2005 | Wilkinson et al. |
| 2006/0133585 A1 | 6/2006 | Daigle et al. |
| 2007/0050306 A1 | 3/2007 | McQueen |
| 2007/0064883 A1 | 3/2007 | Rosenthal et al. |
| 2010/0159891 A1 | 6/2010 | Sigmund et al. |
| 2010/0324909 A1 | 12/2010 | Runge et al. | ly
MESSAGING TRANSLATION SERVICES

CROSS-REFERENCE TO RELATED APPLICATION

This application is a continuation of U.S. patent application Ser. No. 13/849,997, filed Mar. 25, 2013, which is a continuation of U.S. patent application Ser. No. 12/637,378, filed Dec. 14, 2009, now U.S. Pat. No. 8,406,385, issued Mar. 26, 2013, which is a continuation of U.S. patent application Ser. No. 11/304,032, filed Dec. 15, 2005, now U.S. Pat. No. 7,657,006, issued Feb. 2, 2010, which is entirely incorporated herein by reference.

TECHNICAL FIELD

The present disclosure is generally related to electronic messaging and, more particularly, to customization of electronic messaging content.

BACKGROUND

In telephone communications, voice mail systems are provided so that telephone callers may leave voice mail messages to users of the system. Accordingly, many features are provided by voice mail systems to allow users to access their voice mail messages in a convenient and useful manner. For example, a user may be provided options to allow the user to navigate through the recorded message using his telephone keypad or voice input that can effect a skip, rewind, pause, or other similar operations.

However, in some situations, a user may not be able to review and comprehend a voice mail message via his telephone or other audio terminal with conventional voice mail options. Additional servicing of a voice mail message may be needed. For example, a voice mail message may be in a language that the user is not able to understand. Thus, although the user may be able to access the voice mail message, he or she may not be able to comprehend it. Similar problems also appear in other types of messaging systems.

Thus, a heretofore unaddressed need exists in the industry to address the aforementioned deficiencies and inadequacies.

SUMMARY

Embodiments of the present disclosure provide methods and devices for translating a message. In this regard, one embodiment of such a method, among others, can be broadly summarized by the following steps: generating an electronic message in an understood language of an originating party; receiving instructions to translate contents of the electronic message to another language; converting the electronic message to the another language in accordance with the instructions; and delivering the converted electronic message to the receiving party.

Embodiments also include a computer readable medium having a computer program for performing the above steps. Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
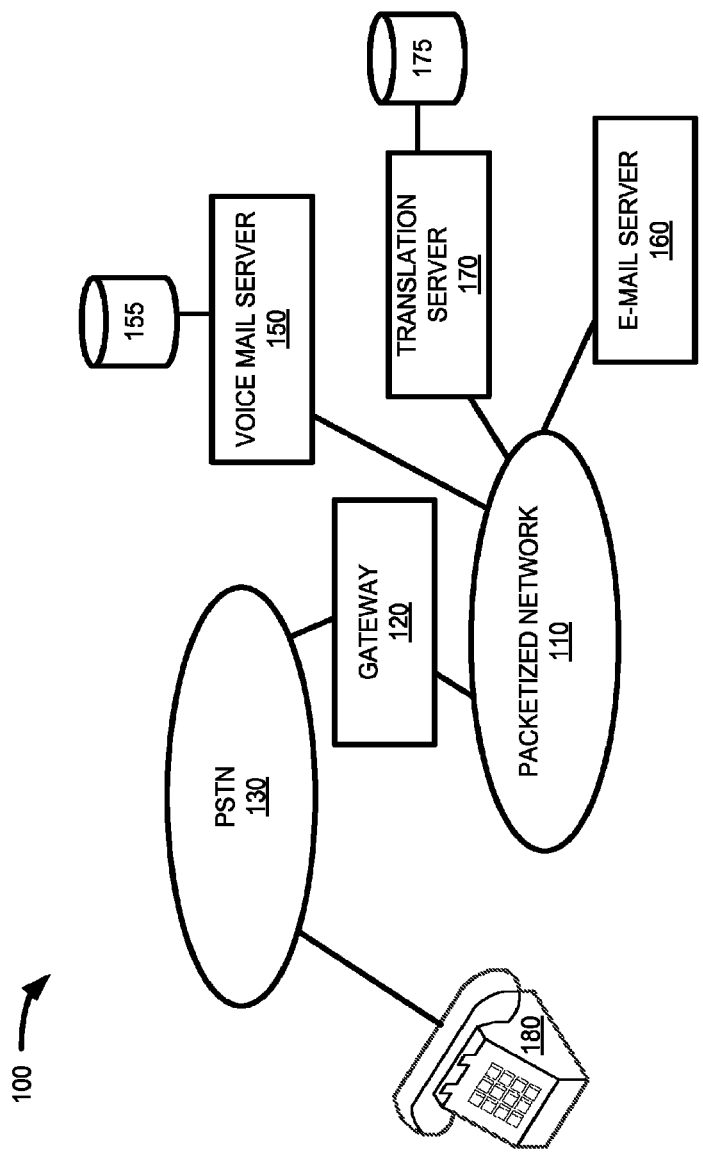
FIG. 1 is a block diagram of one embodiment of a communications network of the present disclosure.

FIG. 1 shows one embodiment, among others, of a communications network 100 of the present disclosure. Communications network 100 includes a governmental, private, or public network that provides a communications conduit between a voice mail server 150 and access device(s) 180.

One embodiment of the communications network 100, among others, includes a packetized network 110 (e.g., an Internet protocol (IP) or intranet network that utilize packet-switching paradigm) interfaced with other devices. Packetized network 110 may represent, for example, communications through the Internet using various known protocols. Gateway 120 is interfaced between packetized network 110 and a public switched telecommunications network (PSTN) 130 and acts as a link between the two networks that may utilize different network protocols. PSTN 130 is further coupled to access device(s) 180. Thus, access device(s) 180 may communicate through PSTN 130 with other communications devices interfaced with PSTN 130, or they may communicate with other communications devices interfaced through packetized network 110.

Packetized network 110 may also include an electronic mail (e-mail) server 160 for processing e-mail or other messages. Examples of messages include, but are not limited to, e-mail, voice mail, text, audio or visual information, multimedia information, or programming information.

In some embodiments, communication network 100 enables communication between similar and different voice mail systems or platforms. Accordingly, the communication network 100 ties various voice mail platforms so that they can send messages to each other over a TCP/IP (Transmission Control Protocol/Internet Protocol) network. The communications network 100 and voice mail systems, for example, may follow an Audio Message Interchange Specification (AMIS) standard or Voice Profile for Internet Messaging (VPIM) standard to facilitate communications between various voice mail systems.

A voice mail system employs use of the voice mail server 150. The voice mail server 150 features the capability to store messages in a variety of audible, data formats required for providing a voice messaging service. These may include such information as spoken name, personal greeting, and class of service. A lightweight directory access protocol (LDAP) server, or other online directory service, may be used to aid in the lookup of such information that is associated with a telephone number of a voice mail user. In any case, the voice mail server 150 operates transparently to the subscriber in a manner similar to the service provided by a conventional, voice-grade telecommunications service. The subscriber sets up the service and then utilizes whatever device is convenient to retrieve messages from the voice mail server 150.

In an embodiment of the present disclosure, a subscriber or a person leaving a message for a subscriber accesses the voice mail server 150 through an access device 180. In the embodiment shown in FIG. 1, the access device 180 is a standard telephone, as shown in FIG. 1. In other embodiments, the access device 180 may also include a personal digital assistant (PDA), a personal computer (PC), or a cell phone. Various other access devices, such as handheld messaging devices and Internet appliances, may also be used to leave and to retrieve messages. The access device 180 may be connected to the voice mail server 150 over a PSTN network, an IP-telephony connection, or over any other type of analog or data network.

According to an exemplary embodiment, the voice mail server 150 performs the functions of audio play and record, text-to-speech synthesis, dual-tone multi-frequency (DTMF) (touch-tone) recognition, automatic speech recognition (ASR) processing, and other call control functions necessary for interactive services. The voice mail server 150 functions to accept inputs from the telephone end user as speech or DTMF signals and makes requests over the packetized network 110 to those web servers that provide interactive voice response (IVR) services with which the end user wishes to interact. In particular, the voice mail system includes logic for detecting a user's touch-tone keypad inputs and automatically recognizing and interpreting the recipient's voice and touch-tone inputs to effect interaction and navigation within the voice mail system. Further, in some embodiments, a user may interface with interactive voice response (IVR) menus using a graphical interface, such as a web-browser, in addition to audio interfaces accessed over a telephone, for example.

The voice mail server 150 may be a general or special-purpose computer. The computer utilizes a processor, executing an operating system, such as a Unix®, Linux Windows®, Macintosh®, or other operating system. The voice mail server 150 also utilizes applications software for receiving, storing, processing, and delivering messages. In other embodiments, the voice mail server 150 may include multiple computers in communication with one another, such as a server farm, cluster, or grid.

Database 155 may also maintain information about voice mail message mailboxes of users that are hosted by the voice mail system. Database 155 may be a general or special purpose computer or may be software executing on the voice mail server 150. The database 155 may also include a storage network having multiple computers executing as a grid or cluster. The database management software may be a proprietary database format or any of a number of commercially available database products, such as Oracle® or Microsoft SQL Server®.

In one embodiment, the database 155 stores subscriber profiles that are accessed by the voice mail server 150. A subscriber profile may include subscriber preferences. Subscriber preferences include such information as indication of a spoken language to be used in voice mail menu prompts, where the spoken language is understood by the subscriber. An embodiment of the present disclosure takes the information from the subscriber profile to help generate a new version of a voice mail message in a language that is understood by a user of the voice mail system.

Embodiments of the present disclosure provide systems and methods for providing advanced translation services (by a voice mail translation system) as part of a voice mail system.

As on example, an embodiment of the present disclosure includes a translation server 170 that includes a processor for translating voice mail messages from a spoken language of the party that generated the message to a spoken language of the user of the voice mailbox where the message is delivered. The voice mail system also includes a processor (e.g., as embodied in a voice mail server 150) for extracting information for determining from what spoken language a voice mail message should be translated from and to which spoken language the voice mail message should be translated to and a database 155 for storing a subscriber profile of users of the voice mail system.

In one embodiment, the voice mail server 150 may forward the voice mail message to the translation server 170 with related information, such as identification of the voice mail user or subscriber, the identified language of the message, and the preferred spoken language of the voice mail user. Generally, the translation server 170 employs a translation algorithm for the identified language of the message such that the logic of the translation server 170 identifies words within the message and then maps the words to corresponding words in the preferred language of the user. Then, the translation server 170 (or related component) utilizes a voice generation algorithm to form an audible message in the language of the user expressing the words of the message.

As previously mentioned, the translation server 170 utilizes information provided by the subscriber profile and a voice mail message to translate information for creating a new version of the voice mail message in another spoken language. For example, the database 155 may contain a voice mail message for a subscriber that is in a foreign spoken language. The subscriber profile provides information indicating that the subscriber prefers to have voice mail messages in a designated spoken language that is understood by the subscriber. The translation server 170, therefore, utilizes this information in concert with the actual contents of the message provided by the voice mail server 150 to create a translated version of the voice mail message in the preferred spoken language.

To do so, in one embodiment, the translation server 170 accesses a library 175 of algorithms or scripts with instructions for performing an automated translation from one spoken language to another. For example, the library may contain a script with instructions for performing an automated translation from language "A" to language "B." Further, the translation server 170 may also utilize more than one script to perform a translation. For example, to perform an automated translation from language "A" to language "C," the translation server 170 may utilize a script to perform an automated translation from language "A" to language "B" and another script to perform a translation from language "B" to language "C" where multiple scripts are employed to perform the translation from "A" to "C". Lernout & Hauspie® is one company, among others, involved in producing translation software that may be used in one embodiment of the present disclosure.

The translation server 170 may also feature a voice recognition unit (not shown) coupled to receive encoded voice data to recognize segments of speech that are then mapped by the translation server 170 to corresponding segments of speech in a preferred spoken language. An audio representation of the speech pattern may then be synthesized using a concatenative synthesis technique or a formant synthesis technique, for example.

In one embodiment, the voice mail server may be included as part of packetized network 110. In alternative embodiments, the voice mail server may be included as part of PSTN 130. The voice mail server may be interfaced by both packetized network 110 and PSTN 130, in some embodiments. A translation server 170 provides automated translation services through packetized network 110 to the voice mail server 150. The translation server 170 may reside outside or inside a voice mail system, in various embodiments.

To help further explain advantageous features of the present disclosure, the following example is provided. In this example, consider that a user or subscriber of a voice mail server is a business person in the United States and the user has a customer in another country that speaks a different language than the user. The customer in the other country needs to communicate a message to the user. Accordingly, the customer places a telephone call to the user and is forwarded to the voice mail system of the user. The customer leaves a voice mail message for the user asking for help on an important matter. A problem is that the user does not speak or understand the spoken language of the customer.

Accordingly, in one embodiment of the present disclosure, a user interfaces his voice mail system through an interactive menu. In one embodiment, the interactive menu is provided by interaction between a touch-tone telephone and the voice mail system. The interactive menu may offer a "tree-like" format for the user. The user begins the menu at the "trunk" of the tree. As the user selects specific menu items, he or she is guided down "branches" of the tree. Each "branch" may then have several "sub-branches" that may be navigated by the user. If the user makes a mistake, he or she return to the previous menu or "branch."

Figure 2:
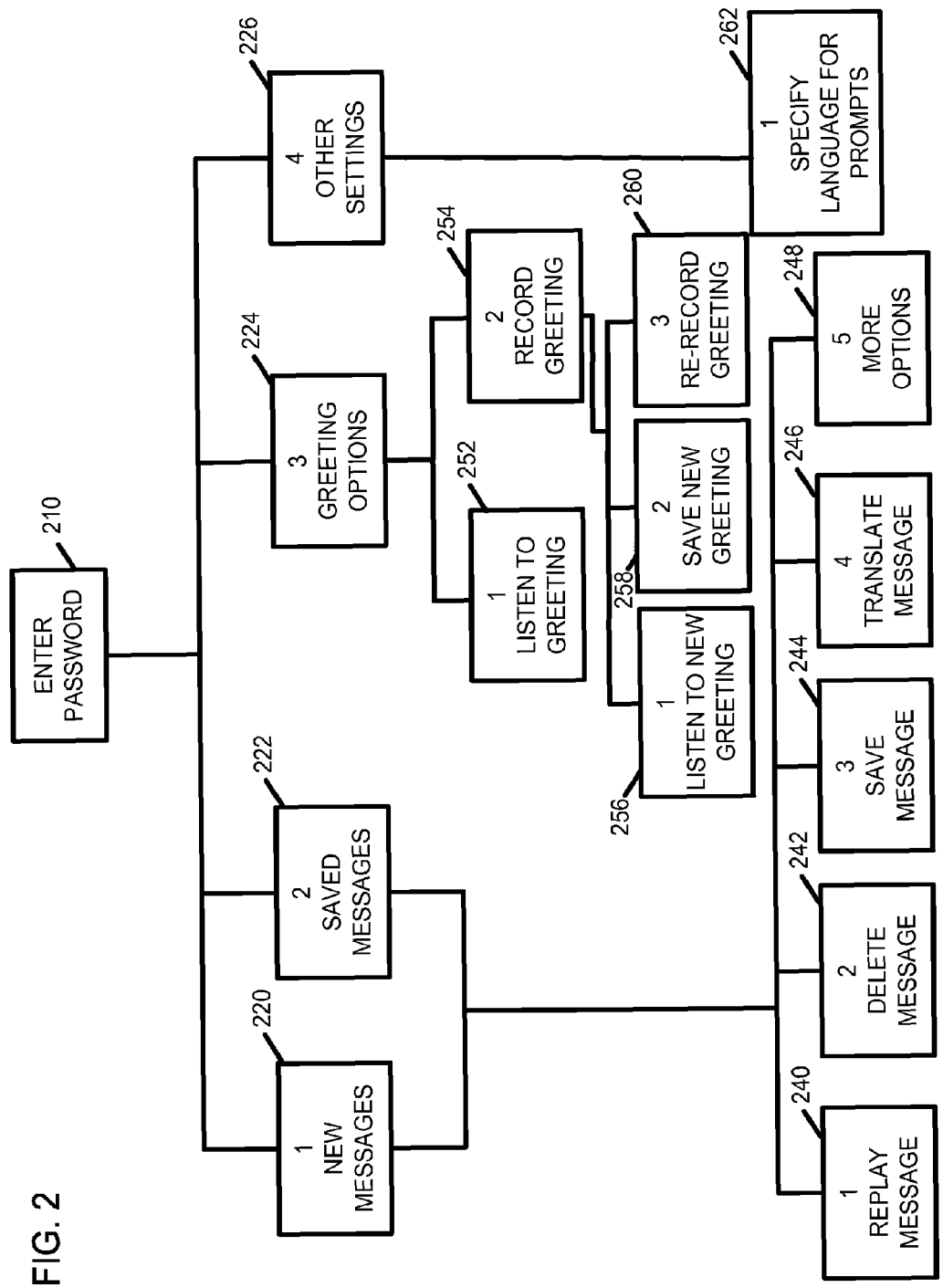
FIG. 2 is a diagram of an interactive menu format for one embodiment of a voice mail system of the network of FIG. 1.

FIG. 2 displays an interactive menu format for one embodiment. It should be noted, there are many other possible menu formats, and the example presented in FIG. 2 is thus only one example of a possible menu format.

Here, a user first enters his password (210) to the voice mail system to verify that the user is authorized to access the voice mail system. When the voice mail server 150 receives a request from the subscriber to access a voice mail recording or message, the voice mail server 150 identifies the user, for example, by validating a password associated with a mailbox number of the user. Then, the user is presented with options for accessing new messages (220), saved messages (222), greeting settings (224), or other voicemail settings (226). If the user selects to review a new or saved message, then the user is presented with additional options, such as replaying a message (240), deleting a message (242), saving a message (244), translating a message (246), and other options (248).

Additional options are also included for configuring a greeting a voice mailbox including listening to a current greeting (252), recording a new greeting (254), listening to a newly recorded greeting (256), saving a newly recorded greeting (258), and re-recording a greeting (260). Also, other options may also be included for setting up a voice mail service, including the option of specifying a spoken language for voice menu prompts (262).

Accordingly, in one embodiment, the menu is provided in a prerecorded, verbal form by the voice mail server 150. For purposes of illustration and example, the menu can include the following prerecorded message: "Welcome. If you already know the number of your selection, you can dial it at any time. Press 1 to access new messages. Press 2 to access saved messages. Press 3 to review or configure your greeting options. Press 4 to access other voice mail options." In addition to the telecommunication options, the interactive menu can provide additional announcements to promote new services, to inform of changes in telecommunication services, and to provide news.

Therefore, in the present example, the user may choose to select the option (246) of translating a voice mail message from a foreign spoken language into a spoken language understood by the user, in accordance with one embodiment of the present disclosure. For example, in one implementation of a menu system, after the user of the voice mail system listens to a voice mail message and realizes that it is in a foreign language, the user may then back out of the current menu selection and choose the option to translate the message into another spoken language. Accordingly, in response to selection of this option, the voice mail message left by the customer is accessed by the translation server 150 and a version of the message is generated in a spoken language identified by the user and placed in the mailbox of the user. Therefore, the user has two messages—the original message in the original language and the translated message—available to him.

One advantage of this approach is that the translation service is performed asynchronously: First, a caller may call and leave a voice mail message or recording and at whatever time he or she wants to and the recipient can retrieve the message at whatever time he or she wants and have it translated a desired time. Further, implementing the automated translation service requires no technical knowledge or set-up on part of the party leaving the message and the party receiving the message.

The immediacy at which the translated message is provided to the user is dependent upon the processing abilities of the translation server 170 and the complexity of the algorithm for translating the foreign language of the voice mail message to a spoken language preferred by the user. However, in some embodiments, the translation service may be performed ahead of time.

For example, a calling party into a voice mail system may be prompted to or afforded an opportunity to select a spoken language for voice menu prompts that are used to navigate the voice mail system. In this way, a calling party can utilize voice menu prompts in the language preferred by the calling party. Accordingly, the voice mail system may detect that a calling party has selected a language for prompts of an interactive menu that is not the same as a language identified by a user or subscriber of the voice mail system, where the user has previously designated a preference for a particular spoken language. For example, the user of the voice mail system may have a subscriber profile that identifies that the user prefers his or her menu prompts to be provided in a particular language.

In one embodiment, the voice mail server 150 receives a voice mail message directed to a subscriber. In response, the voice mail server 150 searches a database 155 for a subscriber profile that includes the subscriber's preferences. The voice mail server 155 utilizes these preferences to process the message in accordance with the subscriber's preferences. In one embodiment, the voice mail server 155 automatically translates a voice mail message to a spoken language preferred by the subscriber.

In such a case, the voice mail server 155 may request a translated version of a voice mail message automatically be generated (by the translation server 170) upon receipt of the voice mail message in the voice mail system. Further, in some embodiments, a user may designate in his or her subscriber profile whether he or she prefers that translated versions of messages be automatically generated in such a fashion.

In an alternative embodiment, an interactive menu of a voice mail system may provide an option to a calling party to generate a translated version of a voice mail message generated by the calling party. This option may be provided as a standard option to the calling party as part of the interactive menu presented to the calling party. Alternatively, this option may be provided after a voice mail server 150 detects that a language being used by the calling party is different that a language used by the user of the voice mail system for which the voice mail message is being placed.

In addition to detecting a language from which customizations of interactive menus are based, telephone exchange information of the calling party and/or called party may be used to trigger the offering of automated translation services to the calling party and/or called party, in some embodiments. Also, in one embodiment, the voice mail server 155 may prompt a user with an option of translating a voice mail message when the user attempts to access the voice mail message for the first time.

Further, in addition to using calling party or geographical information associated with calling number information, some embodiments utilize language-specific access telephone numbers to determine the caller's language. In one embodiment, a voicemail service provider provides various language-specific access numbers that correspond to the various languages offered. A voicemail subscriber may then direct his or her correspondents to dial the language-specific access number or the subscriber may maintain a telephone number that forwarded to a language-specific voicemail access number.

When a foreign language speaker reaches the voicemail system using a language-specific access number, the system may provide special options available only to a foreign language speaker, e.g., the system may offer to translate the message before or after the caller leaves the message. Also, the system may provide the caller with a special code that the caller can use to retrieve a translated reply at a later time. This allows a non-subscriber to retrieve translated messages. Further, the foreign language speaker may indicate that he or she wants the message to be translated into the subscriber's language. In such embodiments, the voicemail system would provide instructions and a code to retrieve a translated message. The voicemail subscriber may later retrieve the translated message and be instructed to record a reply. One embodiment of the voicemail translation system would translate the message into the caller's language and make it available for later retrieval using the retrieval code.

Figure 3:
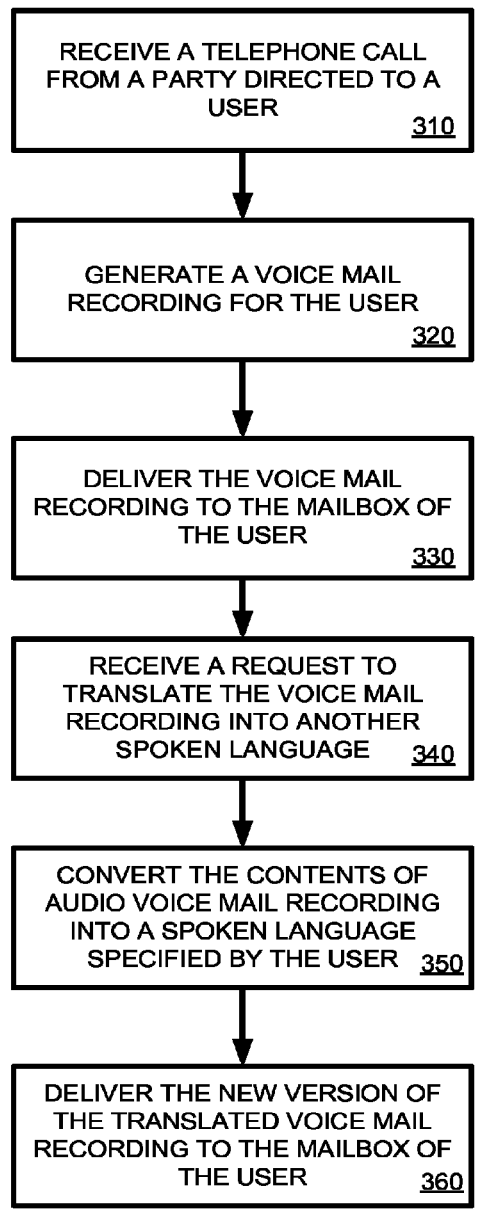
FIG. 3 is a representative process of one embodiment of a voice mail translation service utilized in the network of FIG. 1.

Referring now the flow chart of FIG. 3, a representative process of one embodiment of a voice mail translation service (as may be employed by an embodiment of a voice translation system) is described. The flow chart begins with a calling party places a telephone call to a user of the voice mail system and is forwarded to a voice mail system. The voice mail system receives (310) the telephone call. In accordance with services offered by the voice mail system, the calling party leaves an audio voice mail recording for the user or subscriber of the voice mail system. Thus, the voice mail system generates (320) a voice mail recording by the calling party for the user and delivers (330) the voice mail recording to the mailbox of the user. The user of the voice mail system may then later access the voice mail recording from the voice mail system and make a request to the voice mail service to have the voice mail recording translated into another spoken language specified by the user. Accordingly, the voice mail system receives (340) a request or instruction to translate the voice mail recording into another spoken language.

A translation service of the voice mail system then converts (350) the contents of audio voice mail recording into the spoken language specified by the user which is delivered (360) as a new version of the audio voice mail recording to the mailbox of the user. The new translated voice recording is created using speech synthesis and machine language translation technology. In some embodiments, note that the user may request an e-mail version of the translated message to be generated and delivered to an e-mail address of the user instead of or in addition to the new audio recording message that is delivered to the voice mailbox of the user.

As noted previously, in some embodiments, spoken language preferences of the calling and/or called party may be procured from language selections previously made by a party in interacting with the voice mail system. In addition, in some embodiments, the voice mail system may recognize a spoken language of a party from voice recognition technology employed by components of the voice mail system, where the spoken language of the party is inferred by analyzing the spoken speech of the party in interacting with the voice mail system.

Figure 4:
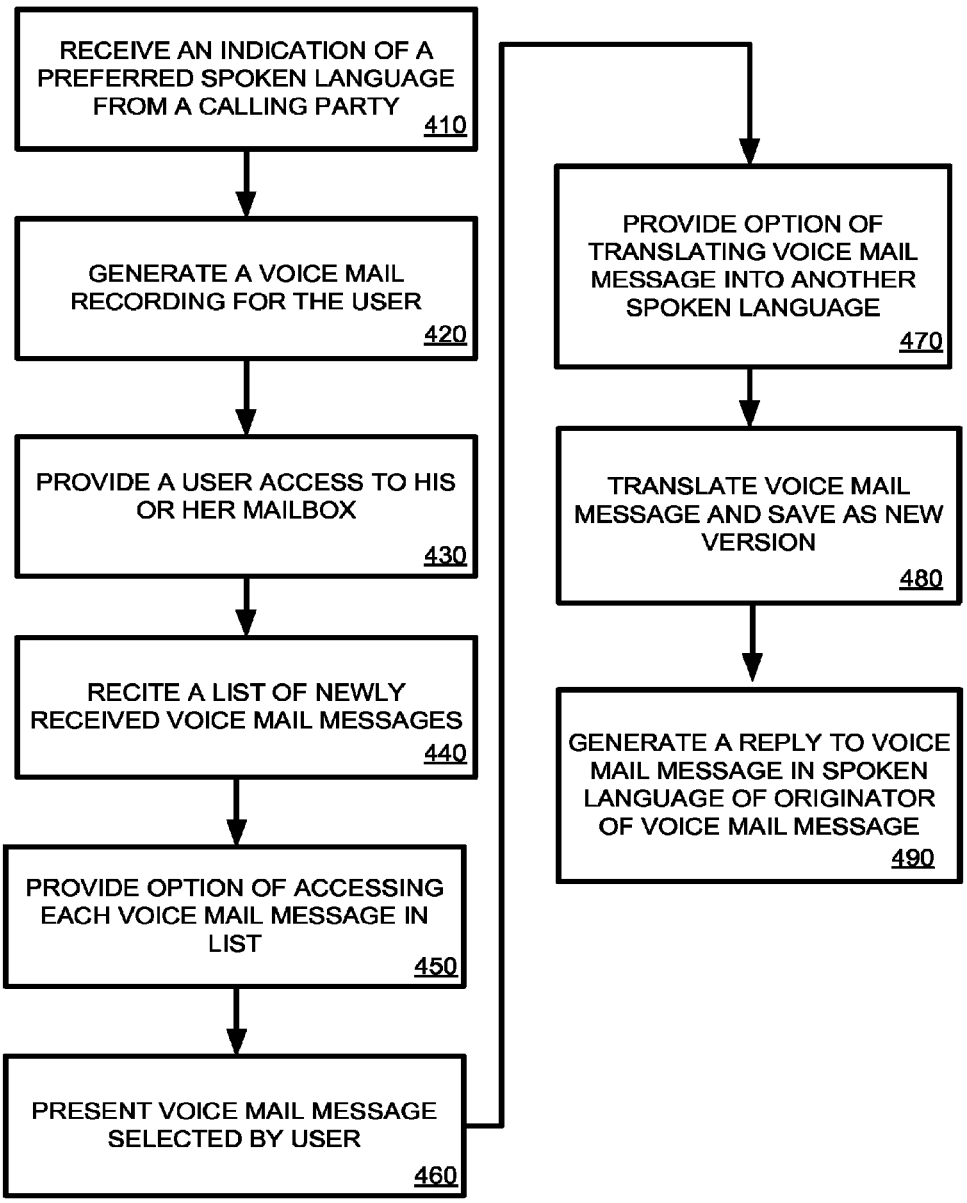
FIG. 4 is a representative process of one embodiment of a voice mail translation service utilized in the network of FIG. 1.

Next, FIG. 4 describes a process for another embodiment of a voice mail translation process. To begin with, a calling party accesses a voice mail system and indicates that the user's spoken language is "language A" (e.g., whether by affirmatively designating as such or indirectly indicating as such). Therefore, a voice mail system receives (410) an indication of a preferred spoken language from a calling party. Also, the calling party acts to generate (420) a voice mail recording for a user of the voice mail system.

In step 430, the user of the voice mail system accesses his or her voice mail mailbox, for example, by keying in or speaking an identification code following entry of his or her mailbox number. In response, the voicemail system may recite (440) a list of newly received voice mail messages. At the end of each recitation, the user is given the option of pressing a key or speaking a command to access the message, as shown in step 450. Once the user presses the key or answers "yes" to select a particular voice mail message, the message is then presented to the user in step 460. Note that corresponding prompts may also be provided for stored messages that have been previously accessed by a user and are available to the user.

In accordance with one embodiment, after a user accesses a message, the user is provided with an option for translating a voice mail message into another spoken language, as shown in step 470. For example, this option may be provided to a user after a spoken language is detected for a voice mail message that is different than a preferred spoken language of the user or after a user invokes a command directed toward performing an automated translation service. In either case, the voice mail message is translated (480) by the voice mail system into a new version of the voice mail message in a different spoken language than the original voice mail message. The new version is saved in the mailbox of the user.

In one embodiment, a complete interactive voice response system may be implemented based on recognition of a spoken language of a party. For instance, a voice mail message may be left in a spoken language and translated into a spoken language preferred by a user. The user may then reply to the message by connecting to the voice mail system of the originator and leaving a voice mail message for the originator of the prior voice mail message at the mailbox of the originator. In doing so, the user may invoke a command to have the reply translated into the spoken language of the originator by the voice mail system of the originator where the voice mail systems of the user and the originator may communicate pertinent information to complete this task, such as the spoken language of the user. Alternatively, the voice mail message left by the user may be translated when the originator accesses his or her voice mail system to access the message. In either case, a reply to the voice mail message is generated in the spoken language of the originator of the voice mail message, as shown in step 490 of FIG. 4.

As an additional option, a translation server 170 may have more than one algorithm available for translating a voice mail message from one language into another. Therefore, if a default algorithm used for translating a voice mail message does not produce a version of the message that is clearly understood by the user, the voice mail server may provide an option of performing a new translation using a different algorithm. Further, in some embodiments, the voice mail server 150 may provide a user an option of specifying a particular vocabulary of words to be used in performing an automated translation of a voice mail message. For example, if a user is involved in a specialized trade or industry, than a vocabulary of terms often used in the specialized industry may be used to translate voice mail messages received by the user on his or her mailbox that is used for business purposes. In a situation where a user is not satisfied with a translated version of a voice mail message, the user may also have the option of having the original voice mail message transferred to a live translation service, where a human translator performs a translation of the message that is recorded and returned to the mailbox of the user.

In accordance with the present disclosure, the translation server 170 is capable of performing a translation for any set of spoken languages, as long as it has access to instructions for performing the translation. Accordingly, an open source environment could be utilized in one embodiment to encourage the creation of instructions for performing translations from and to as many spoken languages as possible by publishing a methodology used in performing translations that may be utilized by others in designing new translation instructions.

Further, in some embodiments, a party may specify (via an interactive menu or in preferences contained within a subscriber profile) customizations for translated messages. For example, a party may customize a synthesized speech used in the translation. As such, a person may specify a female or a male's type of speech to be used. Other options may also include a child's speech, an adult's speech, an "excited" speech pattern, an "angry" speech pattern, etc. These options may be designated by a party leaving the message or the party receiving the message, in different embodiments.

In one embodiment, a voice mail system may offer the translation service as an integrated part of its core functionality with some additional translation services being offered at an additional expense to a user. Alternatively, in some embodiments, the translation service may be offered as a standalone service that is separate from a voice mail service. Further, the present disclosure is not limited to implementation of a translation system within a voicemail environment. The teachings of the present disclosure may be extended to other types of messaging systems, including implementations involving translating text messages from one language to another, translating a spoken message into a textual message (in the same or a different language), translating a text message into an audible message (in the same or a different language), etc.

In accordance with the present disclosure, the voice mail translation functionality can be implemented in software (e.g., firmware), hardware, or a combination thereof. In one mode, a voice mail translation system 510 is implemented in software, as an executable program, and is executed by a special or general purpose digital computer, such as a personal computer (PC; IBM-compatible, Apple-compatible, or otherwise), workstation, minicomputer, or mainframe computer. An example of a general purpose computer 500 that can implement the voice mail translation system 510 of the present disclosure is shown in FIG. 5.

Figure 5:
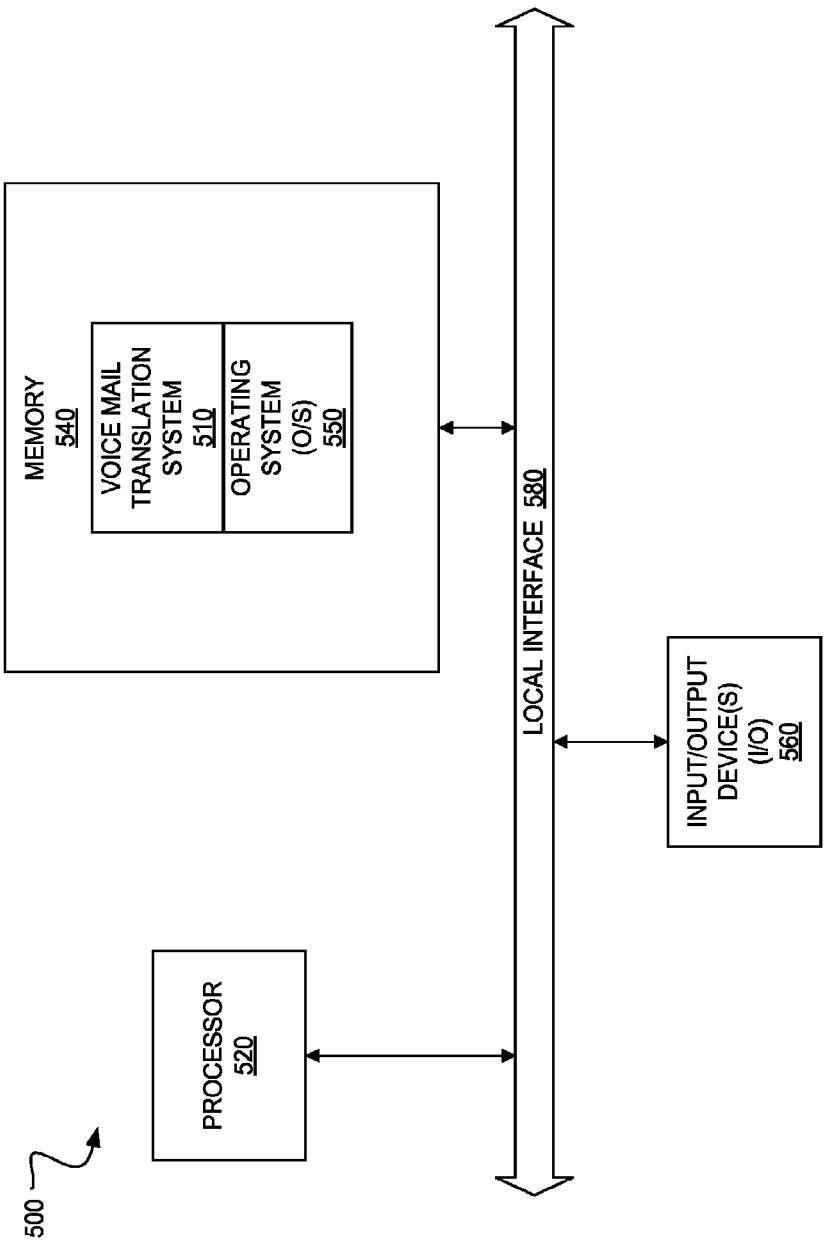
FIG. 5 is a block diagram of a general purpose computer that can implement the voice mail translation system utilized in the network of FIG. 1.

Generally, in terms of hardware architecture, as shown in FIG. 5, the computer 500 includes a processor 520, memory 540, and one or more input and/or output (I/O) devices 560 (or peripherals) that are communicatively coupled via a local interface 580. The local interface 580 can be, for example but not limited to, one or more buses or other wired or wireless connections, as is known in the art. The processor 520 is a hardware device for executing software, particularly that stored in memory 540. The processor 520 can be any custom made or commercially available processor, a central processing unit (CPU), an auxiliary processor among several processors associated with the computer 11, a semiconductor based microprocessor (in the form of a microchip or chip set), a macroprocessor, or generally any device for executing software instructions.

The memory 540 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 540 may incorporate electronic, magnetic, optical, and/or other types of storage media. Note that the memory 540 can have a distributed architecture, where various components are situated remote from one another, but can be accessed by the processor 520.

The software in memory 540 may include one or more separate programs, each of which comprises an ordered listing of executable instructions for implementing logical functions. In the example of FIG. 5, the software in the memory 540 includes the voice mail translation system 510 in accordance with the present disclosure and a suitable operating system (O/S) 550. The operating system 550 essentially controls the execution of other computer programs, such as the voice mail translation system 510, and provides scheduling, input-output control, file and data management, memory management, and communication control and related services.

The voice mail translation system 510 is a source program, executable program (object code), script, or any other entity comprising a set of instructions to be performed. When a source program, then the program is translated via a compiler, assembler, interpreter, or the like, which may or may not be included within the memory 540, so as to operate properly in connection with the O/S 550.

The I/O devices 560 may include input devices, for example but not limited to, a keyboard, mouse, scanner, microphone, etc. Furthermore, the I/O devices 560 may also include output devices, for example but not limited to, a printer, display, etc. Finally, the I/O devices 560 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

When the voice mail translation system 510 is implemented in software, as is shown in FIG. 5, it should be noted that the voice mail translation system 510 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The voice mail translation system 510 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

Any process descriptions or blocks in flow charts should be understood as representing modules, segments, or portions of code which include one or more executable instructions for implementing specific logical functions or steps in the process, and alternate implementations are included within the scope of one or more embodiments of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the present disclosure. For example, other messaging systems may be applicable to the teachings of the present disclosure. In one embodiment, a web, keypad, or voice interface to an e-mail messaging system may also offer translation of e-mail messages into a spoken language of a user, where the translation message may be provided into a text-message, such as an e-mail message, or an audio message that may be retrieved from an access device, such as a telephone. All such modifications and variations are intended to be included herein within the scope of this disclosure.

What is claimed:

1. A method comprising:
   receiving a voice message intended for a recipient user, the voice message being in a first language;
   receiving, from the recipient user, a retrieval code to retrieve the voice message in a second language;
   translating, via a processor and based on the retrieval code, the voice message into the second language, to yield a translated voice message; and
   providing the translated voice message to the recipient user.

2. The method of claim 1, wherein receiving the retrieval code comprises receiving the retrieval code from an output of a keypad.

3. The method of claim 1, further comprising providing the voice message, in addition to the translated voice message, to the recipient user.

4. The method of claim 1, further comprising receiving a selection from the recipient user of a type of voice to be used in the translated voice message.

5. The method of claim 1, further comprising receiving a selection from the recipient user of a type of speech pattern to be used in the translated voice message.

6. The method of claim 1, further comprising:
   generating, in the second language, an email version of the translated voice message; and
   providing the email version to the recipient user.

7. The method of claim 1, wherein the receiving of the voice message, the receiving of the retrieval code, the translating of the voice message, and the providing of the translated voice message are performed on a cell phone.

8. The method of claim 1, wherein the receiving of the voice message, the receiving of the retrieval code, the translating of the voice message, and the providing of the translated voice message are performed on a server.

9. A system comprising:
   a processor; and
   a computer-readable storage device having instructions stored which, when executed by the processor, result in the processor performing operations comprising:
      receiving a voice message intended for a recipient user, the voice message being in a first language;
      receiving, from the recipient user, a retrieval code to retrieve the voice message in a second language;
      translating, via a processor and based on the retrieval code, the voice message into the second language, to yield a translated voice message; and
      providing the translated voice message to the recipient user.

10. The system of claim 9, wherein receiving the retrieval code comprises receiving the code from an output of a keypad.

11. The system of claim 9, the computer-readable storage device having additional instructions stored which result in operations comprising providing the voice message, in addition to the translated voice message, to the recipient user.

12. The system of claim 9, the computer-readable storage device having additional instructions stored which result in operations comprising receiving a selection from the recipient user of a type of voice to be used in the translated voice message.

13. The system of claim 9, the computer-readable storage device having additional instructions stored which result in operations comprising receiving a selection from the recipient user of a type of speech pattern to be used in the translated voice message.

14. The system of claim 9, the computer-readable storage device having additional instructions stored which result in operations comprising:
   generating, in the second language, an email version of the translated voice message; and
   providing the email version to the recipient user.

15. A computer-readable storage device having instructions stored which, when executed by a computing device, cause the computing device to perform operations comprising:
   receiving a voice message intended for a recipient user, the voice message being in a first language;
   receiving, from the recipient user, a retrieval code to retrieve the voice message in a second language;
   translating, via a processor and based on the retrieval code, the voice message into the second language, to yield a translated voice message; and
   providing the translated voice message to the recipient user.

16. The computer-readable storage device of claim 15, wherein receiving the retrieval code comprises receiving the code from an output of a keypad.

17. The computer-readable storage device of claim 15, having additional instructions stored which result in operations comprising providing the voice message, in addition to the translated voice message, to the recipient user.

18. The computer-readable storage device of claim 15, having additional instructions stored which result in operations comprising receiving a selection from the recipient user of a type of voice to be used in the translated voice message.

19. The computer-readable storage device of claim 15, having additional instructions stored which result in operations comprising receiving a selection from the recipient user of a type of speech pattern to be used in the translated voice message.

20. The computer-readable storage device of claim 15, having additional instructions stored which result in operations comprising:
  generating, in the second language, an email version of the translated voice message; and
  providing the email version to the recipient user.

* * * * *